US009424748B2

(12) United States Patent
Stenneth

(10) Patent No.: US 9,424,748 B2
(45) Date of Patent: Aug. 23, 2016

(54) REPORTING TRAFFIC CONDITIONS ON ROAD SEGMENTS CONTAINING A BOTTLENECK

(71) Applicant: HERE Global B.V., Veldhoven (NL)

(72) Inventor: Leon Oliver Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/481,320

(22) Filed: Sep. 9, 2014

(65) Prior Publication Data

US 2016/0071411 A1 Mar. 10, 2016

(51) Int. Cl.
*G06F 19/00* (2011.01)
*G08G 1/01* (2006.01)

(52) U.S. Cl.
CPC .................................... *G08G 1/0141* (2013.01)

(58) Field of Classification Search
None
See application file for complete search history.

(56) References Cited

U.S. PATENT DOCUMENTS 5,646,853 A 7/1997 Takahashi et al.
7,956,768 B2 6/2011 Roberts
8,587,454 B1 11/2013 Dearworth
2011/0160988 A1* 6/2011 Rogers ................ G08G 1/0104 701/119
2012/0330547 A1* 12/2012 Witte ................ G01C 21/3446 701/533

FOREIGN PATENT DOCUMENTS

CN 102436739 A 5/2012

* cited by examiner

*Primary Examiner* — Thomas Tarcza
*Assistant Examiner* — Garrett Evans
(74) *Attorney, Agent, or Firm* — Lempia Summerfield Katz LLC

(57) ABSTRACT

Methods for reporting traffic conditions on road segments containing a bottleneck include: (a) calculating an amount of traffic congestion on a segment of a roadway, the segment containing a bottleneck, based on a free-flow speed specific to a subsection of the segment from which a report of an observed speed is received; and (b) communicating, by the computer processor, information indicative of the amount of traffic congestion on the segment to a client. Apparatuses for reporting traffic conditions on road segments containing a bottleneck are described.

20 Claims, 7 Drawing Sheets

REPORTING TRAFFIC CONDITIONS ON ROAD SEGMENTS CONTAINING A BOTTLENECK

TECHNICAL FIELD

The present teachings relate generally to navigation, maps, Advanced Traveler Information Systems (ATIS), Advanced Driver Assistance Systems (ADAS), Highly Assisted Driving (HAD), and the like.

BACKGROUND

The "toll plaza effect" in a vehicular traffic system refers to the challenge involved in accurately estimating traffic conditions on road segments that contain a toll plaza. The challenge arises from the fact that a probe vehicle traveling on such a road segment may report a plurality of different speed distributions depending on its precise location relative to the toll plaza and the particular time interval (epoch) during which the probe vehicle transmits its report. For example, the probe vehicle may report a high speed (e.g., 100 kph) as the vehicle approaches or leaves the toll plaza, but a very low speed (e.g., 0 kph) as the vehicle slows or stops during payment of the toll.

If, during a first time interval, the probe vehicle transmits only low speed observations to a vehicular traffic system, the vehicular traffic system may mistakenly interpret the low speeds as indicative of congestion and report such a traffic condition to a user (e.g., by coloring a road segment on a map as red). However, in actuality, the low speeds reported by the probe vehicle during the first time interval may be due merely to the slowing of the probe vehicle during payment of a toll—not to traffic congestion per se. In contrast, during a second time interval, the probe vehicle may transmit only high-speed observations to the vehicular traffic system and, on this basis, the vehicular traffic system may determine that traffic is not congested and report such a finding to the user (e.g., by coloring the road segment on a map as green).

Since the determination of "congestion" or "no congestion" may vary according to the particular time interval during which the probe reports are transmitted from the probe vehicle, an undesirable condition known as "thrashing" may result. During thrashing, the traffic conditions for a given road segment may flip back and forth in rapid succession. For example, the coloring of the road segment on a map may flip back and forth between red (e.g., a color indicative of heavy congestion) and green (e.g., a color indicative of little or no congestion). As a result, there may be an increase in congestion messages for certain traffic feeds (e.g., traffic feeds whose specification includes cancel messages that cancel a previously reported congestion level if the current congestion level changes).

SUMMARY

The scope of the present invention is defined solely by the appended claims, and is not affected to any degree by the statements within this summary.

By way of introduction, a method in accordance with the present teachings includes: (a) calculating, by a computer processor, an amount of traffic congestion on a segment of a roadway, the segment containing a bottleneck, based on a free-flow speed specific to a subsection of the segment from which a report of an observed speed is received; and (b) communicating, by the computer processor, information indicative of the amount of traffic congestion on the segment to a client.

An apparatus in accordance with the present teachings includes at least one processor and at least one memory including computer program code for one or more programs. The at least one memory and the computer program code are configured to, with the at least one processor, cause the apparatus to perform at least the following: (a) calculate an amount of traffic congestion on a segment of a roadway, the segment containing a bottleneck, based on a free-flow speed specific to a subsection of the segment from which a report of an observed speed is received; and (b) communicate information indicative of the amount of traffic congestion on the segment to a client.

A non-transitory computer readable storage medium in accordance with the present teachings has stored therein data representing instructions executable by a programmed processor. The storage medium includes instructions for (a) calculating an amount of traffic congestion on a segment of a roadway, the segment containing a bottleneck, based on a free-flow speed specific to a subsection of the segment from which a report of an observed speed is received; and (b) communicating information indicative of the amount of traffic congestion on the segment to a client.

DETAILED DESCRIPTION

Figure 1:
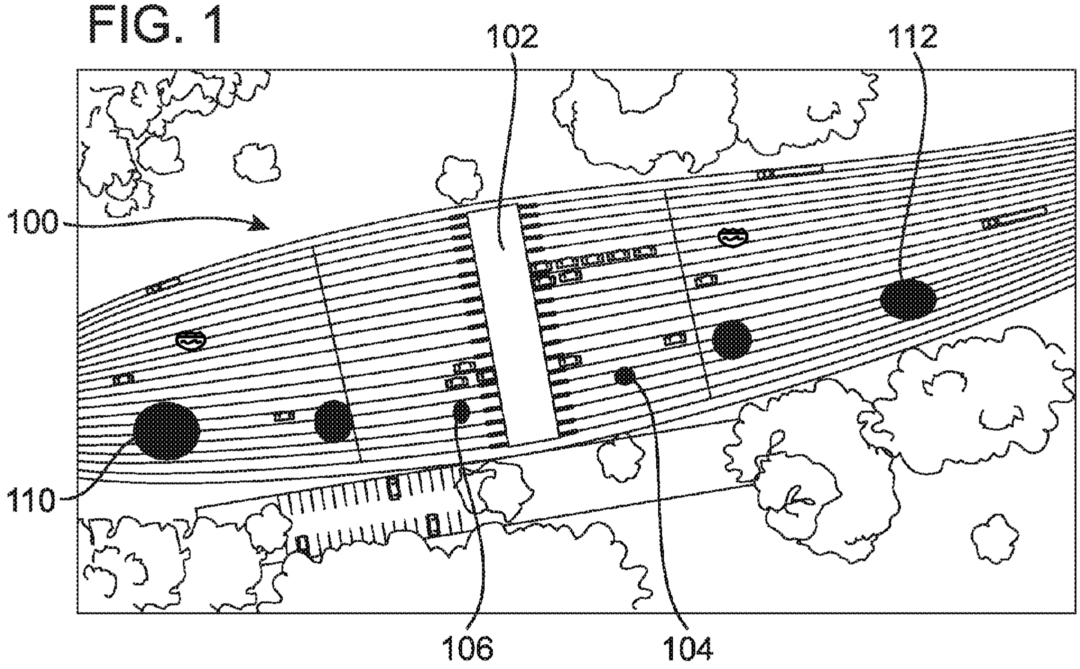
FIG. 1 shows an aerial view of an example of a road segment 100 that contains a toll plaza 102.

Methods and apparatuses with a capacity for mitigating the toll plaza effect have been discovered and are described herein. In accordance with the present teachings, each road segment (e.g., a road link, a TMC, etc.) containing one or more toll plazas (and/or other types of bottlenecks characteristic of the road segment—including but not limited to checkpoints, traffic-calming devices, and/or the like) may be assigned a plurality of free flow speeds corresponding to individual subsections thereof. For example, in some embodiments, a first free flow speed (FFS) is assigned to the subsection of a road segment immediately under a toll plaza, and a second FFS is assigned to the subsections of the road segment before and after the toll plaza. In other embodiments, a first FFS is assigned to the subsection of a road segment immediately under the toll plaza, a second FFS is assigned to the subsection of the road segment before the toll plaza, and a third FFS is assigned to the subsection of the road segment after the toll plaza. With these or similar assignments in place, subsequent quantifications of traffic congestion by a vehicular traffic system may utilize a FFS that is specific to the subsection of the road segment from which the observed speed was transmitted (e.g., by a probe vehicle). In some embodiments, these quantifications may invoke the concept of a “jam factor” (e.g., the ratio of observed speed to FFS).

Throughout this description and in the appended claims, the following definitions are to be understood:

The term “segment” as used in reference to a roadway refers without restriction to any length of any type of thoroughfare configured for use by vehicular traffic. In some embodiments, a segment of a roadway contains one or a plurality of toll plazas.

The term “link” or “road link” refers to any stretch of road between two intersections.

The phrase “traffic message channel” or TMC refers to any set of contiguous road links.

In some embodiments, a “segment” of a roadway corresponds to a road link or a TMC. In other embodiments, a “segment” of a roadway may be larger or smaller than a road link (e.g., a plurality of road links or a subsection of a single road link). In further embodiments, a “segment” of a roadway may be larger or smaller than a TMC (e.g., a plurality of TMCs or a subsection of a single TMC).

It is to be understood that elements and features of the various representative embodiments described below may be combined in different ways to produce new embodiments that likewise fall within the scope of the present teachings.

By way of general introduction, a method in accordance with the present teachings for reporting traffic conditions on road segments containing a bottleneck includes: (a) calculating an amount of traffic congestion on a bottleneck-containing segment of a roadway based on a free-flow speed specific to a subsection of the segment from which a report of an observed speed is received; and (b) communicating information indicative of the amount of traffic congestion on the segment to a client.

In some embodiments, a method in accordance with the present teachings may further include one or more of the following additional acts: (c) partitioning the segment of the roadway into a plurality of subsections; (d) determining the subsection of the segment from which the report of the observed speed is received (e.g., in other words, the subsection from which the report of the observed speed was transmitted); (e) partitioning the segment of the roadway into a first subsection that comprises the bottleneck, a second subsection before the bottleneck in a direction of travel, and a third subsection after the bottleneck in the direction of travel; (f) assigning a first free-flow speed to the first subsection, a second free-flow speed to the second subsection, and a third free-flow speed to the third subsection; and/or (g) selecting a desired display format and/or content for the information.

In some embodiments, the bottleneck in the road segment comprises a toll plaza, a checkpoint (e.g., a police checkpoint, a border crossing, etc.), a traffic-calming device (e.g., a lane narrowing; a vertical deflection including but not limited to speed humps, speed bumps, speed tables, speed cushions, and/or the like; a horizontal deflection including but not limited to chicanes; etc.), and/or the like, and combinations thereof. In some embodiments, the bottleneck comprises one or a plurality of toll plazas.

In some embodiments, the bottleneck-containing road segment comprises a road link, a TMC, and/or a combination thereof.

In some embodiments, a method in accordance with the present teachings further includes partitioning the segment of the roadway into a plurality of subsections, wherein each of the plurality of subsections is associated with a characteristic FFS. In some embodiments, a method in accordance with the present teachings further includes partitioning the segment of the roadway into a first subsection that comprises a toll plaza, a second subsection before the toll plaza in a direction of travel, and a third subsection after the toll plaza in the direction of travel. In some embodiments, the method further includes assigning a first FFS to the first subsection, a second FFS to the second subsection, and a third FFS to the third subsection. In some embodiments, the second FFS and the third FFS are different (e.g., when the speed entering a toll plaza is less than the speed exiting a toll plaza due, for example, to a lane reduction). In some embodiments, the first FFS is less than the second FFS and/or the third FFS. In other embodiments, the second FFS and the third FFS are substantially identical.

In some embodiments, the calculating of the amount of traffic congestion on the bottleneck-containing segment of the roadway comprises computing a jam factor (e.g., a ratio of observed speed to FFS). In accordance with the present teachings, the FFS used in computing the jam factor is specific to the subsection of the road segment from which the observed speed is reported. In some embodiments, the report of the observed speed emanates from one or a plurality of probe vehicles.

In some embodiments, the information indicative of the amount of traffic congestion on the segment communicated to the client comprises color-coded information (e.g., based on colors correlated to pre-defined ranges of jam factors, as further described below).

As used herein the term “client” refers broadly to any type of mobile device (e.g., a vehicle and/or a component thereof, including but not limited to a navigation system, an onboard computer, etc.; a mobile phone; and/or the like). In some embodiments, the mobile device is configured to be under at least partial manual control by a human user (e.g., a vehicle that is configured to receive one or a plurality of HAD services from a remote server). In other embodiments, the mobile device includes an autonomously driven vehicle that may or may not include any human passenger. In some embodiments, the term “client” includes a fleet (e.g., a plurality) of mobile devices each of which is configured to receive the HAD service result. In some embodiments, the client is configured to make an operational adjustment based on receipt of the HAD service result (e.g., an autonomously driven vehicle that makes a course adjustment based on receipt of a warning that traffic congestion lies ahead on the present course).

In some embodiments, the communicating of traffic congestion information to a client comprises displaying the information via a navigation system, a mobile phone, a tablet, a projection, or a combination thereof. In some embodiments, the communicating of information to a client may include visually displaying the information (e.g., on a mobile device and/or the like). By way of example, the information may be displayed via a navigation system, a mobile phone, a tablet, a projection (e.g., onto a windshield, dashboard, console, and/or other surface of a vehicle, etc.), or the like, and combinations thereof. In some embodiments, the information includes color-coding the amount of traffic congestion. For example, a first segment of a roadway having a high amount of traffic congestion (e.g., at or above a predefined first threshold) may be colored red on a map. Similarly, by way of further example, a second segment of a roadway having a moderate amount of traffic congestion (e.g., within a predefined range) may be colored yellow on a map. Furthermore, by way of further example, a third segment of a roadway having a low amount of traffic congestion (e.g., at or below a second threshold) may be colored green on a map.

In some embodiments, the communicating of traffic congestion information to a client may comprise aurally communicating information concerning a segment of a roadway to the user (e.g., through a user interface). In some embodiments, the user may interact with an artificial intelligence (e.g., an intelligent personal assistant or the like) to request that certain information be repeated, to request alternate information, and/or the like using, for example, a voice command device and/or the like.

Figure 6:
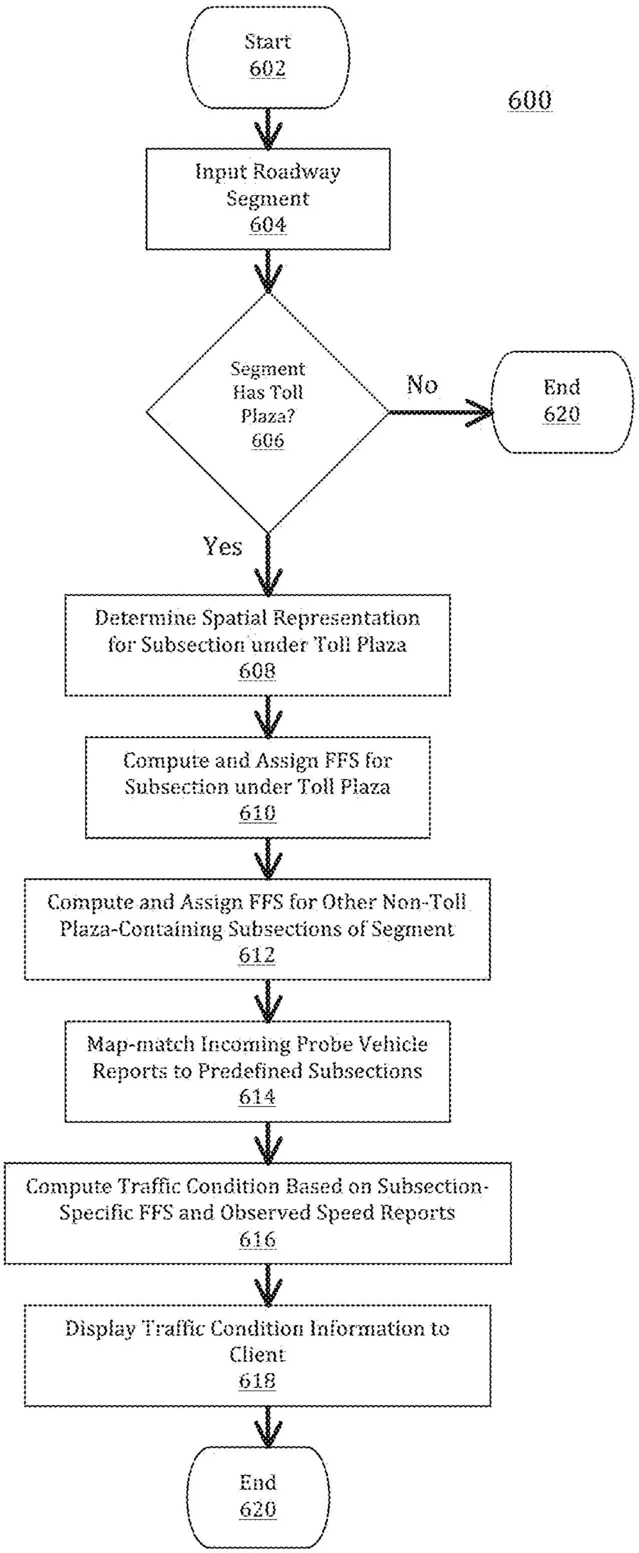
FIG. 6 shows a flow chart of an exemplary process 600 for reporting traffic conditions on road segments containing a toll plaza.

FIG. 6 shows a flow chart of a representative process 600 for reporting traffic conditions on road segments containing a toll plaza in accordance with the present teachings. The process 600 begins at block 602 and includes a first act 604 in which a given roadway segment for which traffic conditions are to be assessed by a vehicular traffic system are input into the vehicular traffic system. At decision block 606, a determination is made as to whether or not the road segment contains a toll plaza. If the road segment does not contain a toll plaza, the process 600 may terminate as shown at block 620. If, however, the road segment contains a toll plaza, the process 600 may proceed to block 608 and a spatial representation of a subsection of the road segment under the toll plaza may be determined.

At block 610 in FIG. 6, a FFS is computed for the subsection under the toll plaza and is assigned to that subsection. At block 612, a FFS is computed and assigned for the other non-toll plaza-containing subsections of the road segment (e.g., the subsection before the toll plaza and the subsection after the toll plaza).

As incoming reports are received by the vehicular traffic system from one or more probe vehicles, the location in the road segment from which the reports are transmitted is map-matched to a predefined subsection of the road segment, as shown at block 614.

At block 616, a traffic condition (e.g., an amount of traffic congestion) may be computed based on observed speed reports received from the one or more probe vehicles and a FFS specific to the subsection of the road segment from which the observed speed reports emanated (e.g., via computation of a jam factor, as described herein). Based on the computation performed at block 616, information relating to the traffic condition may be displayed to a client as shown at block 618.

It is to be understood that the relative ordering of some acts shown in the flow chart of FIG. 6 is meant to be merely representative rather than limiting, and that alternative sequences may be followed. Moreover, it is likewise to be understood that additional, different, or fewer acts may be provided, and that two or more of these acts may occur sequentially, substantially contemporaneously, and/or in alternative orders. Solely by way of example, as shown in FIG. 6, the act 610 is shown as preceding the act 612. However, in alternative embodiments, the ordering of these acts may be reversed.

In some embodiments, a method in accordance with the present teachings for reporting traffic conditions on road segments containing a bottleneck is implemented using a computer and, in some embodiments, one or a plurality of the above-described acts are performed by one or a plurality of processors. In some embodiments, one or more of the one or the plurality of processors include graphics processing units (GPUs). In other embodiments, one or more of the one or the plurality of processors include central processing units (CPUs). In some embodiments, methods in accordance with the present teachings are implemented entirely on GPUs. In some embodiments, GPUs provide improved and/or faster performance.

In some embodiments, as described above, the present teachings provide methods for reporting traffic conditions on road segments containing a bottleneck. In other embodiments, as further described below, the present teachings also provide apparatuses for reporting traffic conditions on road segments containing a bottleneck.

Figure 7:
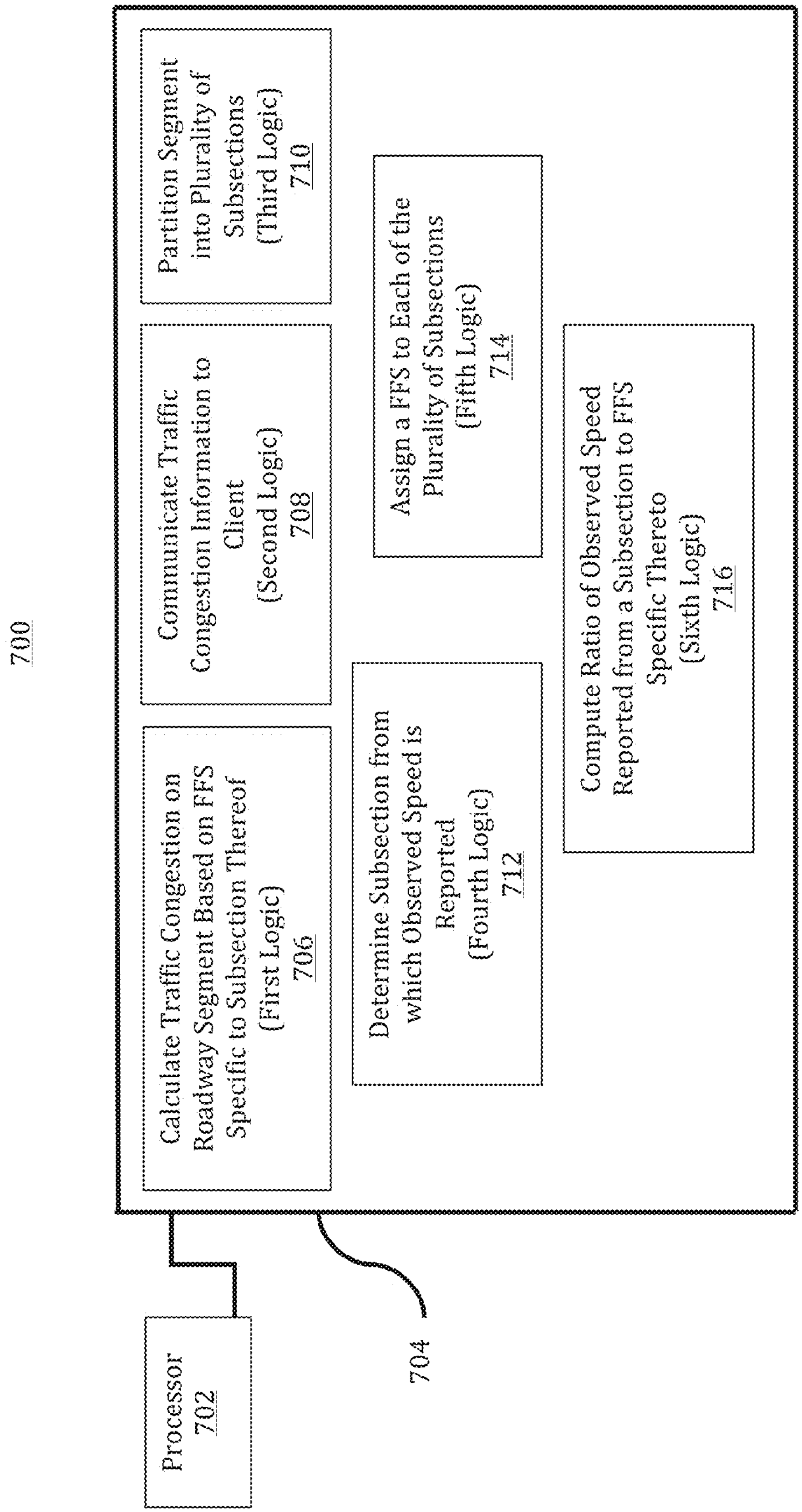
FIG. 7 shows a block diagram of a representative apparatus 700 in accordance with the present teachings for reporting traffic conditions on road segments containing a bottleneck.

FIG. 7 shows a block diagram of a representative first apparatus 700 in accordance with the present teachings for reporting traffic conditions on road segments containing a bottleneck. In some embodiments, an apparatus 700 in accordance with the present teachings is implemented as part of a GPU in a computer system. In other embodiments, the apparatus 700 may be implemented as part of a CPU in a computer system.

In some embodiments, as shown in FIG. 7, the apparatus 700 may include: a processor 702; a non-transitory memory 704 coupled with the processor 702; first logic 706 stored in the non-transitory memory 704 and executable by the processor 702 to cause the apparatus 700 to calculate an amount of traffic congestion on a segment of a roadway, the segment comprising a bottleneck, based on a free-flow speed specific to a subsection of the segment from which a report of an observed speed is received; and second logic 708 stored in the non-transitory memory 704 and executable by the processor 702 to cause the apparatus 700 to communicate information indicative of the amount of traffic congestion on the segment to a client.

In some embodiments, the apparatus 700 may further include one or more of the following: third logic 710 stored in the non-transitory memory 704 and executable by the processor 702 to cause the apparatus 700 to partition the segment of the roadway into a plurality of subsections; fourth logic 712 stored in the non-transitory memory 704 and executable by the processor 702 to cause the apparatus 700 to determine the subsection of the segment from which the report of the observed speed is received; fifth logic 714 stored in the non-transitory memory 704 and executable by the processor 702 to cause the apparatus 700 to assign a FFS to each of the plurality of subsections; and/or sixth logic 716 stored in the non-transitory memory 704 and executable by the processor 702 to cause the apparatus 700 to compute a ratio of the observed speed to the FFS specific to the subsection of the segment from which the report of the observed speed is received.

In some embodiments, the apparatus 700 is configured as a device selected from the group consisting of navigation systems, mobile phones, personal computers, game consoles, laptops, notebooks, tablets, portable media players, personal digital assistants, pagers, and the like, and combinations thereof. In some embodiments, the apparatus 700 is configured as a navigation system and/or a mobile phone and further includes: (a) user interface circuitry and user interface software configured to (i) facilitate user control of at least some functions of the navigation system and/or mobile phone though use of a display and (ii) respond to user inputs; and (b) a display and display circuitry configured to display at least a portion of a user interface of the navigation system and/or mobile phone, the display and the display circuitry configured to facilitate user control of at least some of the functions of the navigation system and/or mobile phone.

A non-transitory computer-readable storage medium in accordance with the present teachings has stored therein data representing instructions executable by a programmed processor for reporting traffic conditions on road segments containing a bottleneck. The storage medium includes instructions for: (a) calculating an amount of traffic congestion on a bottleneck-containing segment of a roadway based on a free-flow speed specific to a subsection of the segment from which a report of an observed speed is received; and (b) communicating information indicative of the amount of traffic congestion on the segment to a client.

The following examples and further description illustrate exemplary features in accordance with the present teachings, and are provided solely by way of illustration. They are not intended to limit the scope of the appended claims or their equivalents.

In some embodiments, a vehicular traffic system is provided in which vehicles may be considered as probes or sensors installed in the pavement.

In some embodiments, for a given segment of a roadway (e.g., a link or TMC), real-time information on speed is received by the vehicular traffic system during a time interval or epoch (e.g., a five-minute period). After the time interval, the real-time information may be aggregated with historical information to provide an estimate. After aggregation, a final speed value representing the traffic flow on the road segment may be outputted. The outputted speed may be converted to a congestion message indicative of the severity of congestion (e.g., heavy, moderate, or light).

To convert from the raw aggregated speed to a level of congestion, the concept of jam factor may be used. As described above, the jam factor is the ratio of observed speed to free flow speed. In some embodiments, the observed speed is the aggregated or outputted speed as described above.

FIG. 1 shows an example of a distribution of speeds as reported by a probe vehicle on a representative road segment 100 that contains a toll plaza 102. The ovals in FIG. 1 represent probe reports emanating from corresponding probe vehicles. In some embodiments, the probe reports include speed, location, and timestamp. The size of the ovals in FIG. 1 is an indication of the magnitude of the speed reported by the probe vehicle. For example, as shown in FIG. 1, a low speed 104 and a low speed 106 are reported under the toll plaza 102. However, a high speed 112 is reported before the toll plaza 102, and a high speed 110 is reported after the toll plaza 102.

Figure 2:
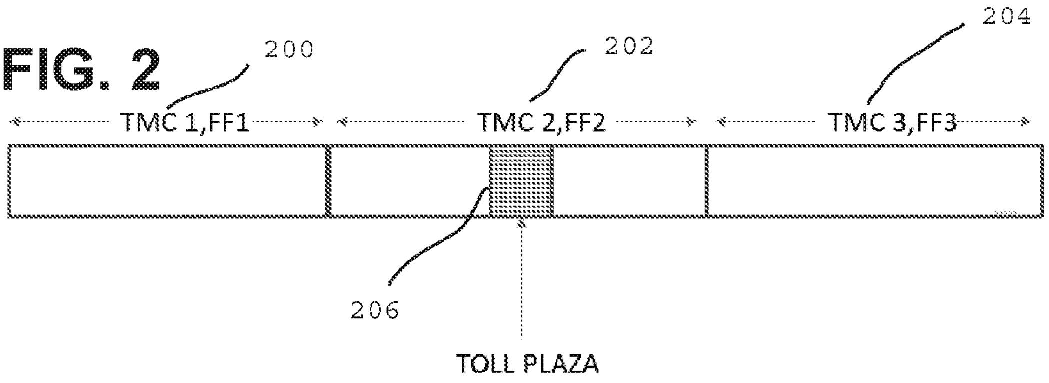
FIG. 2 shows a schematic illustration of an example of a road segment (TMC 2) that contains a toll plaza 206 and that is characterized by a single free flow speed (FF2).

Conventionally, as shown in FIG. 2, each road segment (e.g., a TMC or road link) maintains one FFS throughout the road segment. For example, as shown in FIG. 2, the TMC road segment 200 is characterized by a single free flow speed (FF1), the TMC road segment 204 is characterized by a single free flow speed (FF3, and the TMC road segment 202—which contains a toll plaza 206—is characterized by a single free flow speed (FF2). In other words, the road segment 202 is regarded as a whole and has not been partitioned into a plurality of subsections one or more of which may have its own unique FFS relative to one or more of the others.

Figure 3:
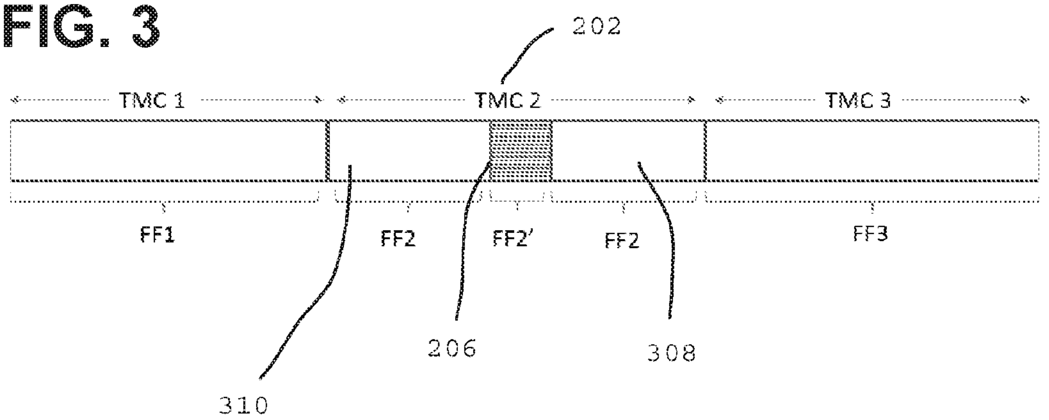
FIG. 3 shows a schematic illustration of an example of a road segment (TMC 2) that contains a toll plaza 206 and that is characterized by a plurality of free flow speeds (FF2 and FF2').

In accordance with the present teachings, in order to mitigate the toll plaza effect, each road segment containing a toll plaza may be partitioned into two or more subsections each of which may be correlated with a specific FFS. Thus, a given road segment containing a toll plaza may maintain more than one FFS. By way of example, as shown in FIG. 3, the road segment 202 containing the toll plaza 206 may be partitioned into a first subsection 308 before the toll plaza 206, a second subsection immediately under the toll plaza 206, and a third subsection 310 after the toll plaza 206. The FFS under the toll plaza is shown in FIG. 3 as FF2'. In some embodiments, the FFS before the toll plaza is the same as the FFS after the toll plaza, and is represented in FIG. 3 as "FF2." In other embodiments (not shown), the FFS corresponding to subsection 308 is not the same as the FFS corresponding to subsection 310, such that the TMC 202 in FIG. 3 may alternatively be characterized by at least three free flow speeds: FF2, FF2', and FF2''.

In some embodiments, as shown in FIG. 3, the FFS assigned to the subsection of the partitioned road segment 202 that is immediately under the toll plaza 206 (viz., FF2') is lower than the FFS assigned to subsection 308 and/or subsection 310. By way of example, the free flow speed FF2' in FIG. 3 may be 7 kph, whereas the free flow speed FF2 of the subsections before and after the toll plaza 206 may be 100 kph (e.g., an actual speed that may occur when density and flow are zero). Thus, in accordance with the present teachings and by way of example, a road segment containing a toll plaza may maintain both a high value FFS (e.g., 100 kph) and a low value FFS (e.g., 7 kph). In some embodiments, a road segment containing a toll plaza may further maintain one or more additional FFS values.

As described above, traffic conditions on a given road segment may be quantified as the ratio between the average observed speed and the free flow speed at that time. This ratio, known as the jam factor (JF), may be used to color road segments on a map. For example, a road segment may be colored as black (e.g., JF<0.030), red (e.g., 0.03<JF<0.330), yellow (e.g., 0.330<JF<0.727), and/or green (e.g., 0.727<JF<1.0). Thus, if the FFS for a given road segment is 100 kph and the observed speed is 90 kph, the corresponding jam factor may be represented by the ratio 90/100 (=0.9), which indicates no congestion corresponding to a green color on the map. However, if the observed speed for the same road segment is 10 kph, then the corresponding jam factor may be given by 10/100 (=0.1), which indicates heavy congestion corresponding to a red color on the map.

Figure 4:
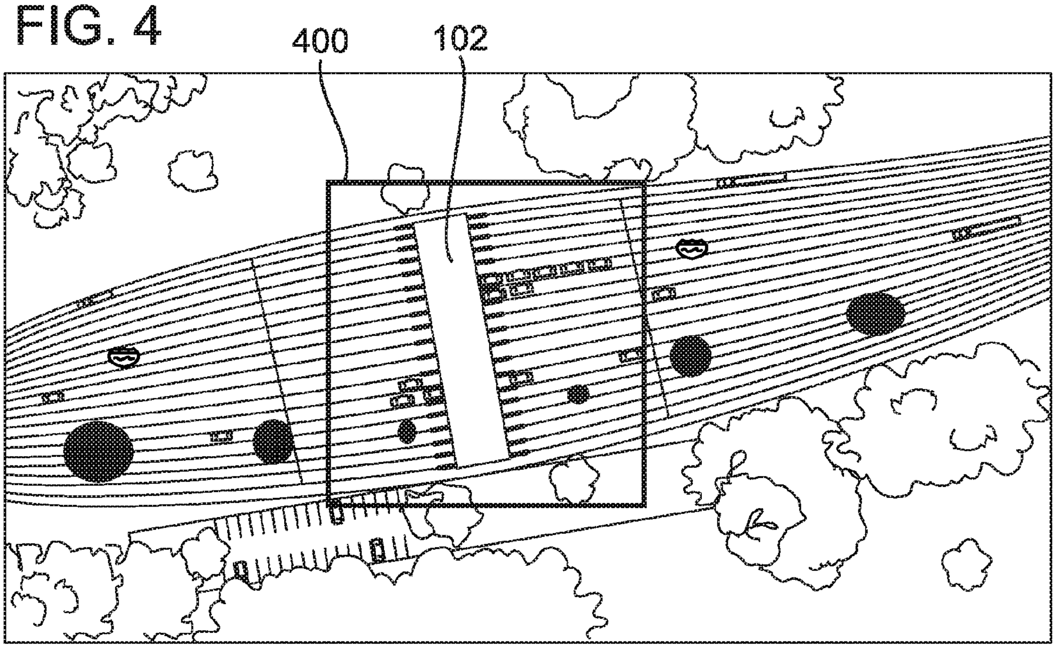
FIG. 4 shows an aerial view of the exemplary toll plaza-containing road segment of FIG. 1 with a bounding box 400 formed around the toll plaza 102.
Figure 5:
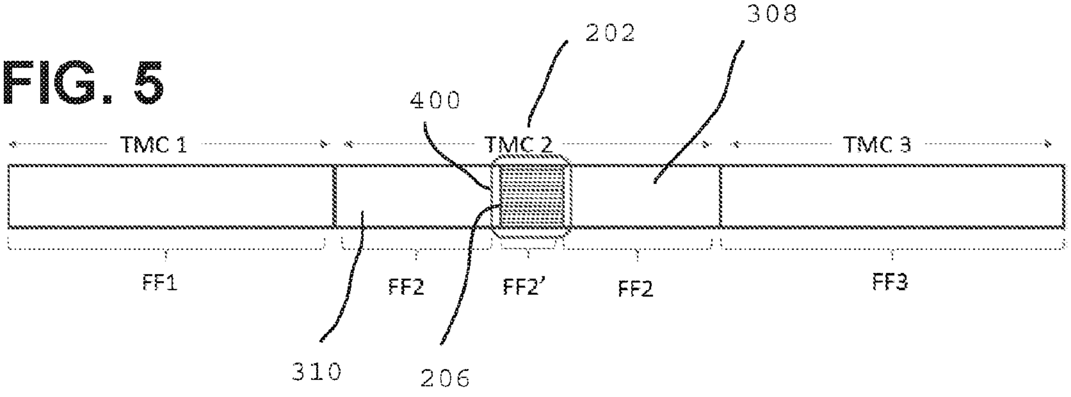
FIG. 5 shows a schematic illustration of the exemplary road segment of FIG. 3 with a bounding box 400 formed around the toll plaza 206.

After the road segment has been partitioned into multiple subsections, a bounding box may be formed around the toll plaza as shown, for example, in FIGS. 4 and 5. For example, the subsection of the road segment containing the toll plaza (e.g., the subsection governed by the free flow speed FF2' in FIG. 3) may be encompassed by a two-dimensional bounding box 400 as shown in FIGS. 4 and 5.

In accordance with the present teachings, when an estimate on speed is performed (e.g., by a probe vehicle transmitting its report to a vehicular traffic system), the location of the probe that provided the estimate may be taken into consideration. A representative procedure for using a bounding box 400 as shown in FIGS. 4 and 5 in conjunction with the assigning of multiple free flow speeds to a road segment containing a toll plaza is further described below in reference to FIGS. 4 and 5.

If the one or more probes used in processing emanated from within the bounding box 400, then a low-speed free flow speed (e.g., FF2' in FIG. 5) may be used to compute the corresponding jam factor. If the one or more probes used in processing emanated from outside of the bounding box 400, then a high-speed free flow speed (e.g., FF2 in FIG. 5) may be used to compute the corresponding jam factor. If the one or more probes used in processing emanated from both inside and outside of the bounding box 400, then a high-speed free flow speed (e.g., FF2 in FIG. 5) may be used to compute the corresponding jam factor.

For purposes of illustration, the above-described representative procedure will now be applied to a representative toll-plaza containing road segment characterized by a low-speed FFS of 7 kph and a high-speed FFS of 100 kph. In a first exemplary scenario, a speed estimate of 90 kph is received and a determination is made that all probes that went into the processing came from outside the bounding box. In accordance with the present teachings, a jam factor of 90/100=0.9 is then computed and the road segment is colored green. In a conventional procedure, for this same scenario, the jam factor would still be computed as 90/100=0.9 and the map would still be colored green.

In a second exemplary scenario, a speed estimate of 6 kph is received and a determination is made that all probes that went into the processing came from inside the bounding box. In accordance with the present teachings, a jam factor 6/7=0.85 is computed and the road segment is accurately colored green. By contrast, if a conventional procedure were instead used to address this same scenario, the jam factor would have been computed as 6/100=0.06 and the map would have been inaccurately colored red.

Thus, in accordance with the present teachings, the rapid switching between congestion colorings associated with the toll plaza effect may be avoided and congestion color change consistency may be achieved.

One skilled in the art will appreciate that one or more modules or logic described herein may be implemented using, among other things, a tangible computer-readable medium comprising computer-executable instructions (e.g., executable software code). Alternatively, modules may be implemented as software code, firmware code, hardware, and/or a combination of the aforementioned.

Figure 8:
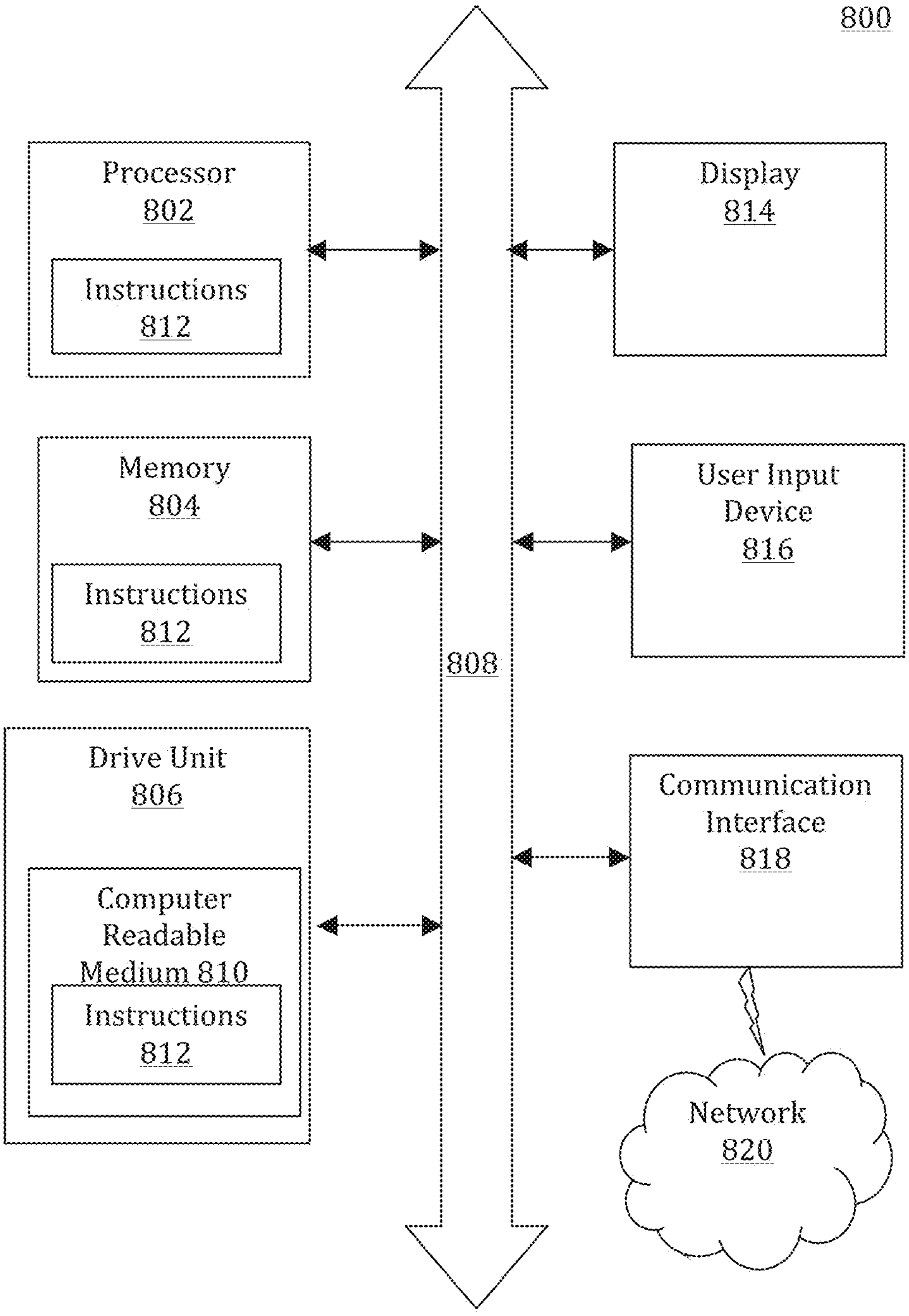
FIG. 8 shows a representative general computer system 800 for use with an apparatus in accordance with the present teachings.

FIG. 8 depicts an illustrative embodiment of a general computer system 800. The computer system 800 can include a set of instructions that can be executed to cause the computer system 800 to perform any one or more of the methods or computer based functions disclosed herein. The computer system 800 may operate as a standalone device or may be connected (e.g., using a network) to other computer systems or peripheral devices. Any of the components discussed above, such as the processor, may be a computer system 800 or a component in the computer system 800. The computer system 800 may implement a navigation system module of which the disclosed embodiments are a component thereof.

In a networked deployment, the computer system 800 may operate in the capacity of a server or as a client user computer in a client-server user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As shown in FIG. 8, the computer system 800 may include a processor 802, for example a central processing unit (CPU), a graphics-processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In some embodiments, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, compact disc (CD), digital video disc (DVD), memory card, memory stick, floppy disc, universal serial bus (USB) memory device, or any other device operative to store data. The memory 804 is operable to store instructions executable by the processor 802. The functions, acts or tasks illustrated in the figures or described herein may be performed by the programmed processor 802 executing the instructions 812 stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown in FIG. 8, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806.

Additionally, as shown in FIG. 8, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800.

In some embodiments, as shown in FIG. 8, the computer system 800 may also include a disk or optical drive unit 806. The disk drive unit 806 may include a computer-readable medium 810 in which one or more sets of instructions 812 (e.g., software) can be embedded. Further, the instructions 812 may embody one or more of the methods or logic as described herein. In some embodiments, the instructions 812 may reside completely, or at least partially, within the memory 804 and/or within the processor 802 during execution by the computer system 800. The memory 804 and the processor 802 also may include computer-readable media as described above.

The present teachings contemplate a computer-readable medium that includes instructions 812 or receives and executes instructions 812 responsive to a propagated signal, so that a device connected to a network 820 can communicate voice, video, audio, images or any other data over the network 820. Further, the instructions 812 may be transmitted or received over the network 820 via a communication interface 818. The communication interface 818 may be a part of the processor 802 or may be a separate component. The communication interface 818 may be created in software or may be a physical connection in hardware. The communication interface 818 is configured to connect with a network 820, external media, the display 814, or any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of subject matter described in this specification can be implemented as one or more computer program products, for example, one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatuses, devices, and machines for processing data, including but not limited to, by way of example, a programmable processor, a computer, or multiple processors or computers. The apparatus can include, in addition to hardware, code that creates an execution environment for the computer program in question (e.g., code that constitutes processor firmware, a protocol stack, a database management system, an operating system, or a combination thereof).

In some embodiments, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the present teachings are considered to include any one or more of a computer-readable medium or a distribution medium and other equivalents and successor media, in which data or instructions may be stored.

In some embodiments, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In some embodiments, the methods described herein may be implemented by software programs executable by a computer system. Further, in some embodiments, implementations can include distributed processing, component/object distributed processing, and parallel processing. Alternatively, virtual computer system processing can be constructed to implement one or more of the methods or functionality as described herein.

Although the present teachings describe components and functions that may be implemented in particular embodiments with reference to particular standards and protocols, the present invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The main elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio player, a Global Positioning System (GPS) receiver, to name just a few. Computer-readable media suitable for storing computer program instructions and data include all forms of non volatile memory, media and memory devices, including but not limited to, by way of example, semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

To provide for interaction with a user, some embodiments of subject matter described herein can be implemented on a device having a display, for example a CRT (cathode ray tube) or LCD (liquid crystal display) monitor, for displaying information to the user and a keyboard and a pointing device, for example a mouse or a trackball, by which the user can provide input to the computer. Other kinds of devices can be used to provide for interaction with a user as well. By way of example, feedback provided to the user can be any form of sensory feedback (e.g., visual feedback, auditory feedback, or tactile feedback); and input from the user can be received in any form, including but not limited to acoustic, speech, or tactile input.

Embodiments of subject matter described herein can be implemented in a computing system that includes a back-end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include but are not limited to a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 CFR §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A method comprising:

determining, by the computer processor, a segment of a roadway including a bottleneck, wherein the bottleneck comprises at least one subsection of the segment of the roadway wherein a low value free-flow speed of the subsection is less than a high value free-flow speed of an adjacent subsection of the roadway during a same period of time;

calculating, by a computer processor, an amount of traffic congestion of the entire segment of the roadway including both the bottleneck and the adjacent subsection, based on the low value free-flow speed when an observed speed is received corresponding to a location in the bottleneck and based on the high value free-flow speed when the observed speed is received corresponding to a location of the adjacent subsection; and communicating, by the computer processor, information indicative of the amount of traffic congestion on the segment for display to a client.

2. The method of claim 1 wherein each of the plurality of subsections is associated with a characteristic free-flow speed.

3. The method of claim 1 further comprising partitioning, by the computer processor, the segment of the roadway into a first subsection that comprises the bottleneck, a second subsection before the bottleneck in a direction of travel, and a third subsection after the bottleneck in the direction of travel.

4. The method of claim 3 further comprising assigning, by the computer processor, a first free-flow speed to the first subsection, a second free-flow speed to the second subsection, and a third free-flow speed to the third subsection.

5. The method of claim 4 wherein the first free-flow speed is less than the second free-flow speed and the third free-flow speed.

6. The method of claim 4 wherein the second free-flow speed and the third free-flow speed are substantially identical.

7. The method of claim 1 wherein the information comprises color-coded information.

8. The method of claim 1 wherein the calculating comprises computing a ratio of the observed speed to the free-flow speed specific to the subsection of the segment from which the report is received.

9. The method of claim 1 wherein the report of the observed speed emanates from one or a plurality of probe vehicles.

10. The method of claim 1 wherein the client is a navigation system, a mobile phone, a tablet, a device capable of projection, or a combination thereof.

11. The method of claim 1 further comprising selecting a desired display format, content for the information, or desired display format and content for the information.

12. The method of claim 1 wherein the bottleneck comprises a toll plaza, a checkpoint, a traffic-calming device, or a combination thereof.

13. The method of claim 1 wherein the bottleneck comprises a toll plaza.

14. The method of claim 1 wherein the segment of the roadway comprises a road link.

15. The method of claim 1 wherein the segment of the roadway comprises a plurality of contiguous road links.

16. An apparatus comprising:

at least one processor; and at least one memory including computer program code for one or more programs, the at least one memory and the computer program code configured to, with the at least one processor, cause the apparatus to perform at least the following:

calculate an amount of traffic congestion on a segment of a roadway, the segment comprising a bottleneck with a free-flow speed varying from at least one other free-flow speed of the segment, wherein the amount of traffic congestion of the segment of the roadway is calculated based on selection of one of the free-flow speeds based on a geographic proximity to the bottleneck of a location from which a report of an observed speed is received; and communicate information indicative of the amount of traffic congestion of the segment to a client for display.

17. The apparatus of claim 16 wherein the at least one memory and the computer program code are further configured to, with the at least one processor, cause the apparatus to perform at least the following:

partition the segment of the roadway into a first subsection that comprises the bottleneck, a second subsection before the bottleneck in a direction of travel, and a third subsection after the bottleneck in the direction of travel; and assign a first free-flow speed to the first subsection, a second free-flow speed to the second subsection, and a third free-flow speed to the third subsection.

18. The apparatus of claim 17 wherein the bottleneck comprises a toll plaza, and wherein the first free-flow speed is less than the second free-flow speed and/or the third free-flow speed.

19. A non-transitory computer-readable storage medium having stored therein data representing instructions executable by a programmed processor, the storage medium comprising instructions for:

calculating a degree of traffic congestion on a segment of a roadway, the segment comprising a plurality of subsections, each subsection having a free-flow speed, wherein one of the plurality of subsections includes a bottleneck, wherein a degree of traffic congestion of the entire segment is based on a free-flow speed specific to the subsection of the segment from which a report of an observed speed is received; and communicating for display, information indicative of the amount of traffic congestion on the segment to a client.

20. The apparatus of claim 16, wherein geographic proximity to the bottleneck is determined based on a geographic location with respect to a bounding box associated with the bottleneck.

* * * * *